(12) United States Patent
Bordere

(10) Patent No.: US 9,322,443 B2
(45) Date of Patent: Apr. 26, 2016

(54) BRAKE DRUM HAVING COOLING VENTS

(71) Applicant: Webb Wheel Products, Inc., Cullman, AL (US)

(72) Inventor: Terrance Bordere, Cullman, AL (US)

(73) Assignee: Webb Wheel Products, Inc., Cullman, AL (US)

( * ) Notice: Subject to any disclaimer, the term of this patent is extended or adjusted under 35 U.S.C. 154(b) by 0 days.

(21) Appl. No.: 14/035,246

(22) Filed: Sep. 24, 2013

(65) Prior Publication Data

US 2015/0083532 A1    Mar. 26, 2015

(51) Int. Cl.
  *F16D 65/10*    (2006.01)
  *F16D 65/02*    (2006.01)

(52) U.S. Cl.
  CPC ........ *F16D 65/10* (2013.01); *F16D 2065/1328* (2013.01)

(58) Field of Classification Search
  CPC .................. F16D 65/10; F16D 65/827; F16D 2065/1332; F16D 2065/1316; F16D 2065/132; F16D 2065/1328; F16D 65/82; F16D 65/80; F16D 65/807; F16D 65/128
  USPC ............. 301/6.1, 6.3, 6.7; 188/218 R, 264 R, 188/264 A, 264 AA
  See application file for complete search history.

(56) References Cited

U.S. PATENT DOCUMENTS

| | | | | |
|---|---|---|---|---|
| 1,426,684 A | * | 8/1922 | Stellmann | 188/218 R |
| 1,897,375 A | * | 2/1933 | Greenwald | 301/64.101 |
| 1,953,815 A | * | 4/1934 | Metzner | 188/218 R |
| 2,087,907 A | * | 7/1937 | Gottlieb et al. | 188/218 R |
| 2,160,272 A | * | 5/1939 | Kranz | 301/37.29 |
| 2,558,296 A | * | 6/1951 | Horn | 188/218 R |
| 2,765,883 A | | 10/1956 | Chayne | |
| 2,812,216 A | * | 11/1957 | Hykes et al. | 301/105.1 |
| 3,016,269 A | * | 1/1962 | De Lorean | 301/6.3 |
| 3,583,533 A | | 6/1971 | Jones, Jr. et al. | |
| 4,135,764 A | | 1/1979 | Johnson et al. | |
| 4,674,606 A | | 6/1987 | Denton | |

(Continued)

FOREIGN PATENT DOCUMENTS

CN    202431796    9/2012
CN    202674108    1/2013

(Continued)

OTHER PUBLICATIONS

Late War E-Brake Assy, FS: Restored Late War E-Brake Assy w/Plc SOLD, http://g503/forums/viewtopic.php?f=5&t=93290, Jun. 26, 2013.

(Continued)

*Primary Examiner* — Anna Momper
*Assistant Examiner* — Stephen Bowes
(74) *Attorney, Agent, or Firm* — Andrus Intellectual Property Law, LLP

(57) ABSTRACT

A brake drum for a vehicle includes a cylindrical main body having a braking surface. A backing plate is adapted to mount the brake drum on the vehicle. A wraparound connects the backing plate to the cylindrical main body and includes an inner annular section positioned adjacent to me hacking plate and an outer annular section positioned adjacent to the cylindrical main body. A vent is formed in the outer annular section. The vent includes an inner edge, an outer edge and a pair of opposing side edge joining the inner and outer edges. The inner edge of the vent features a curved shape.

17 Claims, 6 Drawing Sheets

(56) References Cited

U.S. PATENT DOCUMENTS

| | | | |
|---|---|---|---|
| 4,950,035 A | 8/1990 | Villarreal et al. | |
| 5,383,537 A | 1/1995 | White | |
| 5,964,323 A | 10/1999 | Henry | |
| 6,666,309 B2 | 12/2003 | Brotherton et al. | |
| 7,617,914 B1 | 11/2009 | Huang et al. | |
| 8,181,753 B2 | 5/2012 | Levering et al. | |
| 2008/0308364 A1 | 12/2008 | Huang et al. | |

FOREIGN PATENT DOCUMENTS

| | | | | | |
|---|---|---|---|---|---|
| DE | 637892 C | * | 11/1936 | ................ | B60B 3/00 |
| DE | 4210448 A1 | * | 10/1993 | ............. | F16D 65/12 |
| FR | 870183 A | * | 3/1942 | ............ | F16D 65/827 |
| FR | 1300098 A | * | 7/1962 | ............. | F16D 65/10 |
| JP | 2006-97840 | | 4/2006 | | |
| WO | WO 2012/052647 | | 4/2012 | | |

OTHER PUBLICATIONS

Lightweight on the Brakes, Off Highway Enginneering, http://www.sae.org/mags/sohe/9417, Jun. 26, 2013.

English Translation of JP 2006-97840 published Apr. 13, 2006.

English Abstract of CN 202431796 published Sep. 12, 2012.

English Translation of CN 202674108 published Jan. 16, 2013.

\* cited by examiner

BRAKE DRUM HAVING COOLING VENTS

FIELD OF THE INVENTION

The present invention relates generally to drum brake systems for vehicles and, in particular, to cooling vents for the brake drums of such brake systems.

BACKGROUND

Drum brake systems for vehicles are well known. In such brake systems, the brake drum is used to generate braking torque by serving as a friction couple with brake shoe lining material. A brake drum is typically rigid and of a rounded or cylindrical geometry. It encases the actuating brake components, including the brake shoes, and is constructed of a cylindrical main body featuring a braking surface and a mounting or backing plate connected to the cylindrical main body by the drum wraparound. The drum braking surface is set in motion by the rotation of the vehicle wheel as it is attached to the wheel hub. The backing plate is bolted to the wheel and wheel hub and connects the braking surface of the drum to the rotating system through the wraparound.

When braking occurs, the brake shoes are actuated and move outward away from the center of the vehicle wheel rotation. As the shoes are actuated, they press against the inner diameter of the rotating drum's braking, surface converting kinetic energy to heat energy by means of friction.

As kinetic energy is converted into heat energy, it is desirable to remove as much heat from the system as possible so that more kinetic energy can be converted. One way of removing heat is by cutting vents or windows into the wraparound. Typically this design helps in dissipating heat, but, because the wraparound connects the braking surface to the fixed backing plate, it is subject to mechanical forces. The wraparound thus is a support structure and it is weakened by having material removed for forming the cooling vents or windows. The loading of the wraparound makes both wraparound design and vent or window design critical to the durability of the drum.

There are two common wraparound designs used in brake drums: (1) the straight wraparound, and (2) the shouldered wraparound. The straight wraparound extends from the backing plate at art angle to connect the cylindrical main body, The magnitude of this angle depends on the relation of the bolt-hole pattern diameter to the braking surface diameter. The two features are connected through a section of straight geometry. The shoulder wraparound serves to connect the same two features, but does so through two sections of straight geometries, both at different angles connected by a radius creating a "shoulder" shape. This design is not practical where the bolt-hole diameter is large with respect to the braking surface diameter.

A prior art brake drum is indicated in general at 10 in FIG. 1. The prior art brake drum features a cylindrical main body 12 and a backing plate 14 joined by a straight wraparound 16. As illustrated in FIG. 2, the braking surface 18 of the main body 12 is subjected to a force or load, indicated by arrow 22, by the brake shoe lining material (not shown) when the drum brake system is activated by a driver (such as by the driver pushing the vehicle brake pedal) to stop the vehicle.

As illustrated in FIGS. 1 and 2, the brake drum is provided with a number of cooling windows or vents 24 formed in the straight wraparound 16. As shown in FIG. 2, each cooling vent 24 is defined by a generally vertical outer edge 26 and a generally horizontal inner edge 28. When the load 22 is acting on the braking surface 18, a bending moment, illustrated in FIG. 2 by arrow 30. is formed by a torque arm 32 and a vector 34. This bending moment (30) acts on the inner edge 28 of the vent or window 24, In addition, a tensile force acts on the inner edge 28 of the vent 24, as indicated by vector 36 (FIG. 2). Due to the lengthy horizontal component of the torque arm 32, indicated at 38 in FIG. 2, the bending moment 30 acting on the inner edge of the vent is large as compared to the tensile force 36. The result increases the tendency of the formation of stress cracks on the inner edges of the cooling vents 24 of the prior art brake drum of FIGS. 1 and 2. Decreasing the bending moment 30, even if the tensile three 36 is increased as a result, would reduce the tendency for stress cracks to form on the inner edges of the vent or windows 24, and thus would increase the durability of the brake drum.

Window or vent designs are commonly square in shape with radii in the corners to reduce stress levels. It is common that they are cast-in features and must have a shape that is compatible with the casting process. They are located in the wraparound of the brake drum and have been manufactured in the straight type wraparounds. While it is desirable to provide additional material in the inner two corners of the windows or vents of a brake drum due to the bending moments and tensile forces acting on the inner edge of the window, such an addition of material must be balanced against providing a low brake drum weight and adequate cooling via the vents or widows.

A need exists for a brake drum that addresses at least some of the above issues.

DETAILED DESCRIPTION OF EMBODIMENTS

Figure 1:
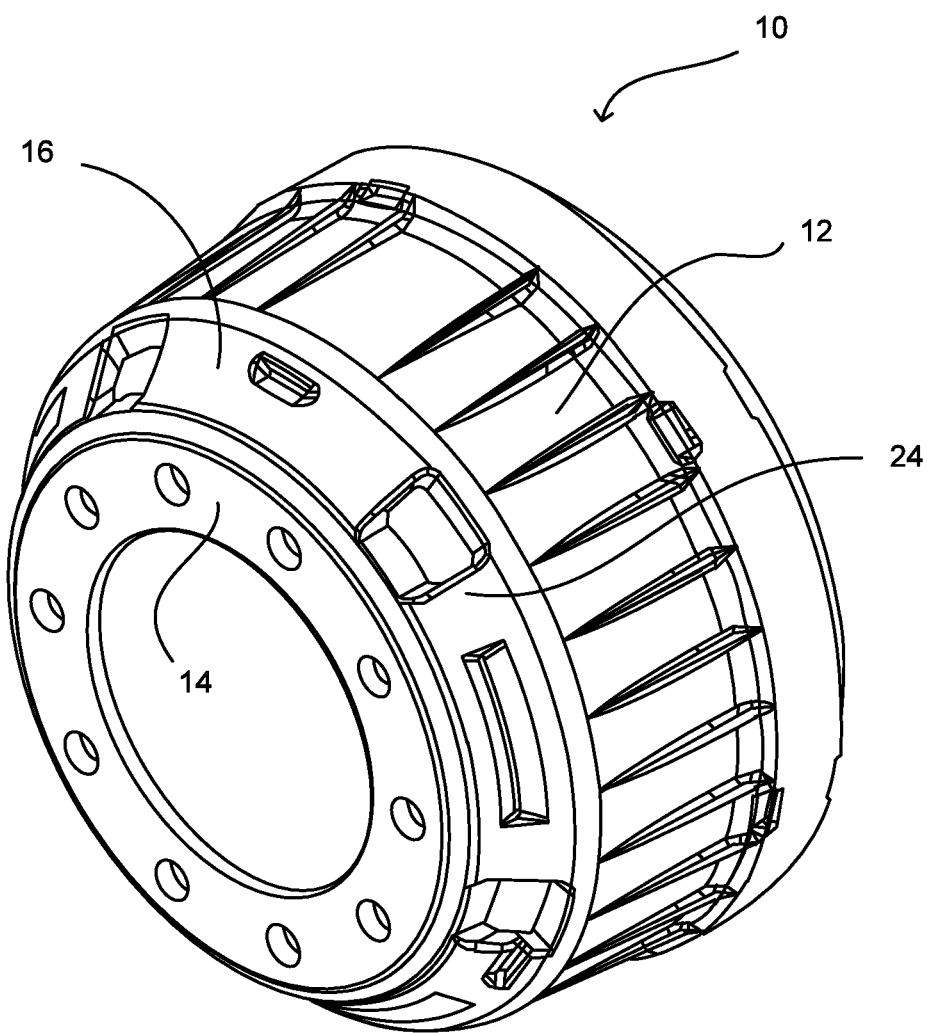
FIG. 1 is a perspective view of a prior art brake drum.
Figure 2:
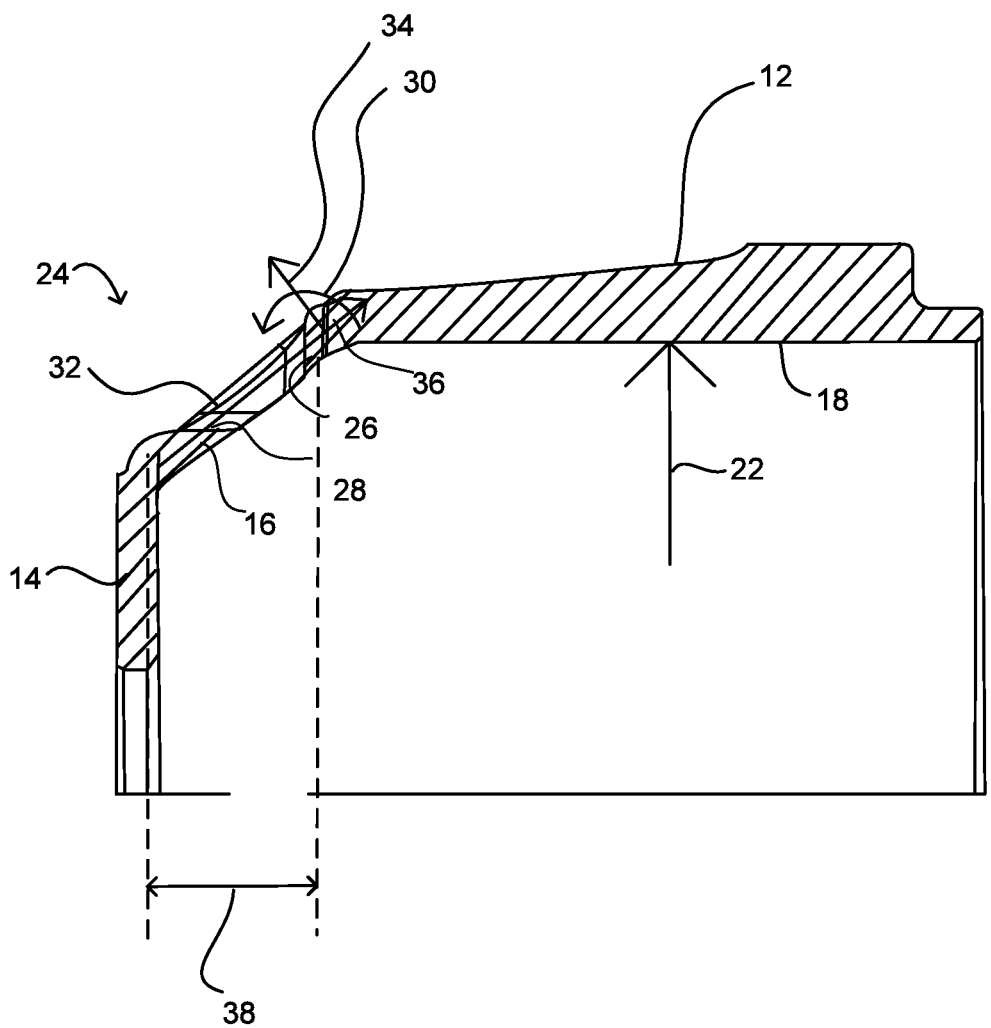
FIG. 2 is a partial cross-sectional view of the brake drum of FIG.
Figure 3:
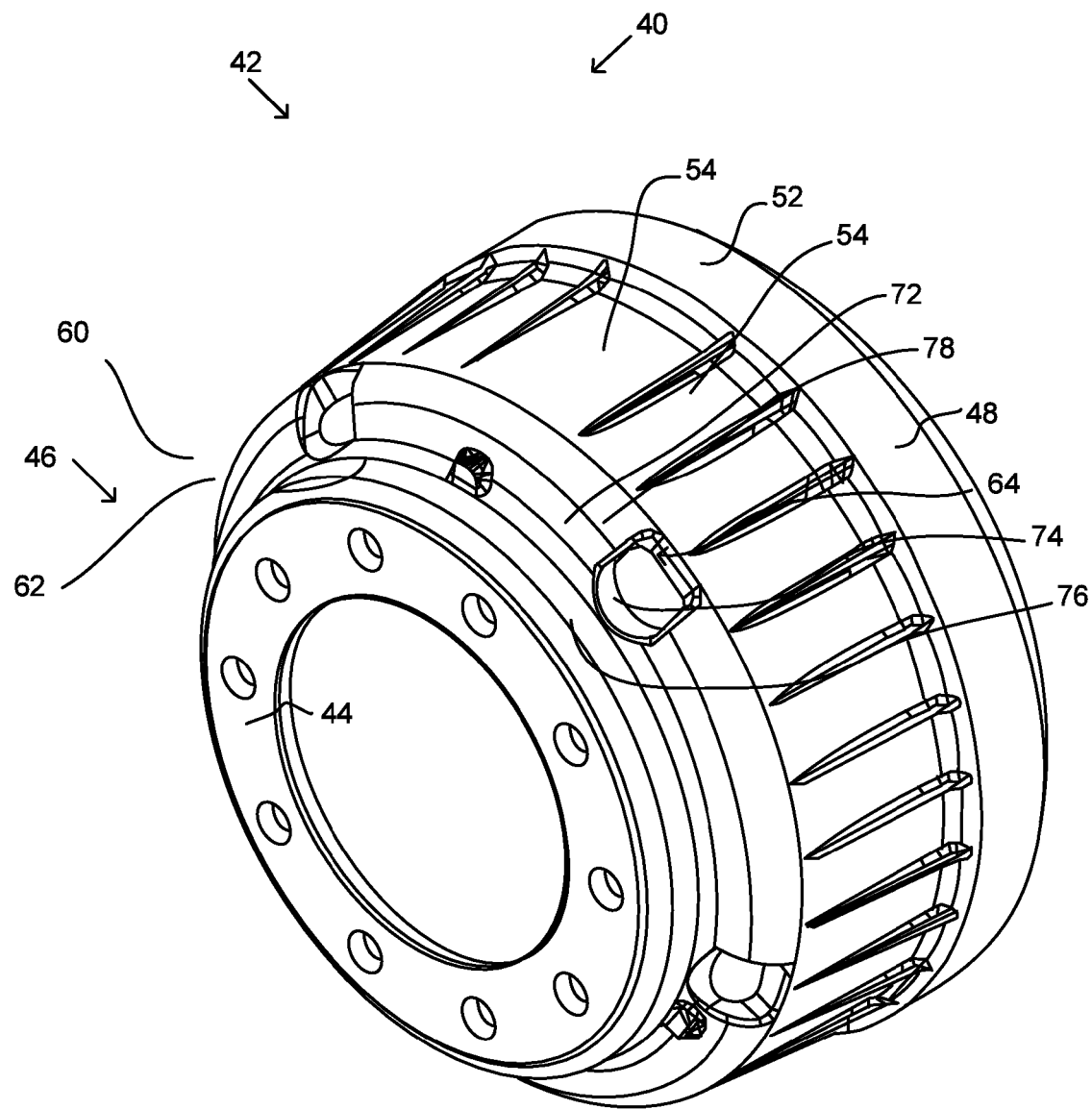
FIG. 3 is a perspective view of an embodiment of the brake drum of the present invention.

An embodiment of the brake drum of the present invention is indicated in general at 40 in FIG. 3. The brake drum 40 features as cylindrical main body, indicated in general at 42, and a backing plate 44 joined by a wraparound, indicated in general at 46. The cylindrical main body 42 features an open end 48, as well as a squealer band 52 and fins 54. As illustrated in FIG. 2, the cylindrical main body 42 also features a braking surface, indicated at 56 (FIG. 4).

The wraparound 46 features a shoulder design where an outer annular section 60 and an inner annular section 62 connect the backing plate 44 and the main cylindrical body 42 so that a shoulder 66 (FIG. 4) is defined. The use of two annular wraparound sections allows for the outer annular section 60 to be generally vertical and the inner annular section 62 to be generally horizontal when the hub is in the orientation illustrated in FIG. 3 (and installed on a vehicle).

Figure 4:
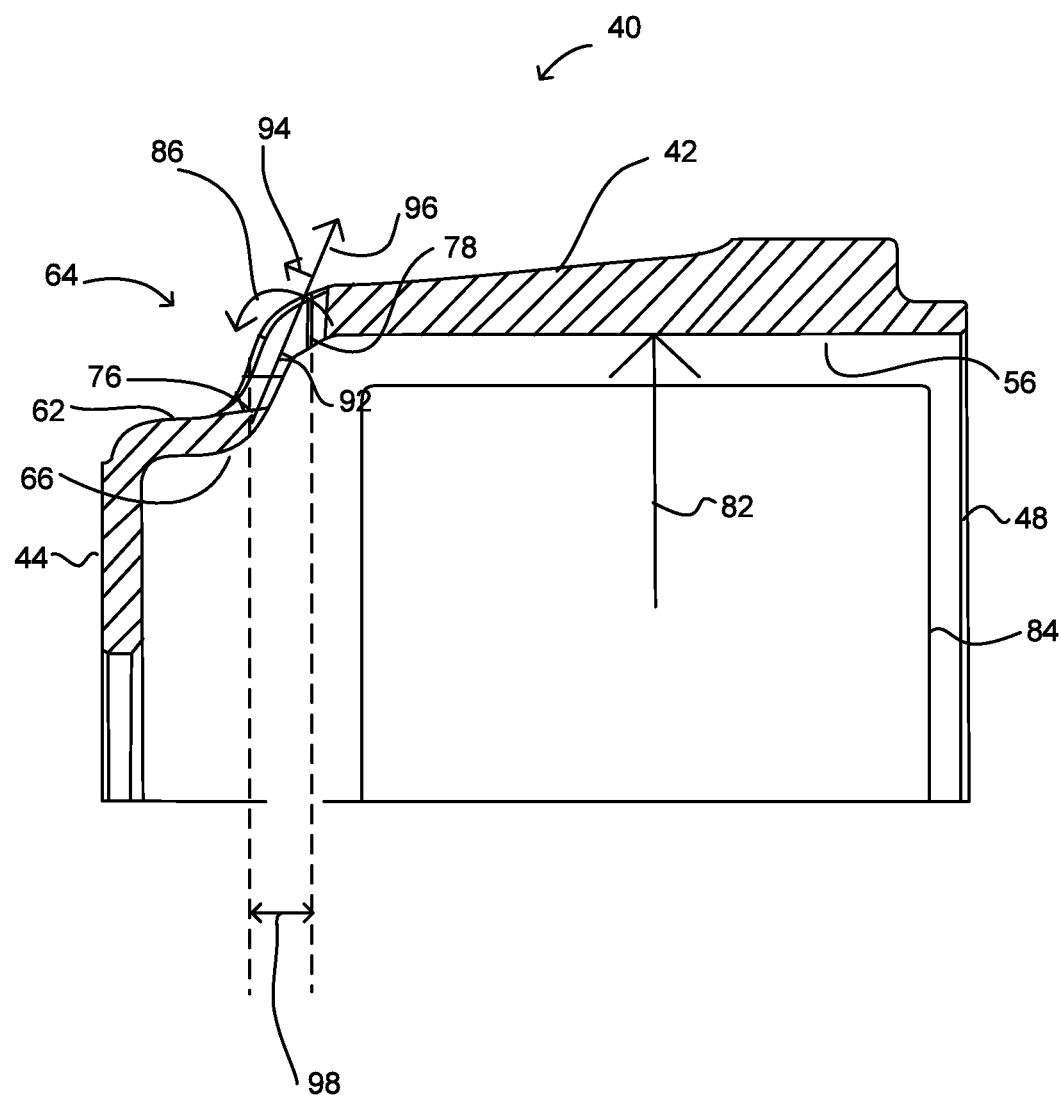
FIG. 4 is a partial cross-sectional view of the brake drum of FIG. 3.

In order to reduce brake shoe lining temperatures to give a longer life cycle, a number of cooling vents, indicated in general at 64 in FIGS. 3 and 4, have been added to the wraparound portion 46. As illustrated in FIG. 3, each cooling vent 64 features a pair of opposing side edges 72 and 74, an inner edge 76 and an outer edge 78. The cooling vent is cut or otherwise formed in the nearly vertical outer annular section 60 of the wraparound 46.

The corners at opposite ends of the inner edge 76 of the vent 64. where the drum material would come to a point, is the place where crack generation is most likely to occur. By placing the vents 64 in the generally vertical outer annular section 60 of the wraparound, the bending moments seen by the points most likely to suffer from crack generation are reduced. More specifically, as illustrated in FIG. 4. the braking surface 56 of the main body 42 is subjected to a force or load, indicated by arrow 82, by the brake shoe lining material 84 when the drum brake system is activated by a driver (such as by the driver pushing the vehicle brake pedal) to stop the vehicle. When the load 82 is acting on the braking surface 56, a bending moment, illustrated in FIG. 3 by arrow 86, is formed by a torque arm 92 and a vector 94. The bending moment 86 acts on the inner edge 76 of the vent or window 64. In addition. a tensile force acts on the inner edge 76 of the vent 64, as indicated by vector 96. Due to the short horizontal component of the torque arm 92, illustrated at 98 in FIG. 4, the bending moment 86 acting on the inner edge 76 of the cooling vent is small as compared to the tensile force 96.

Figure 5:
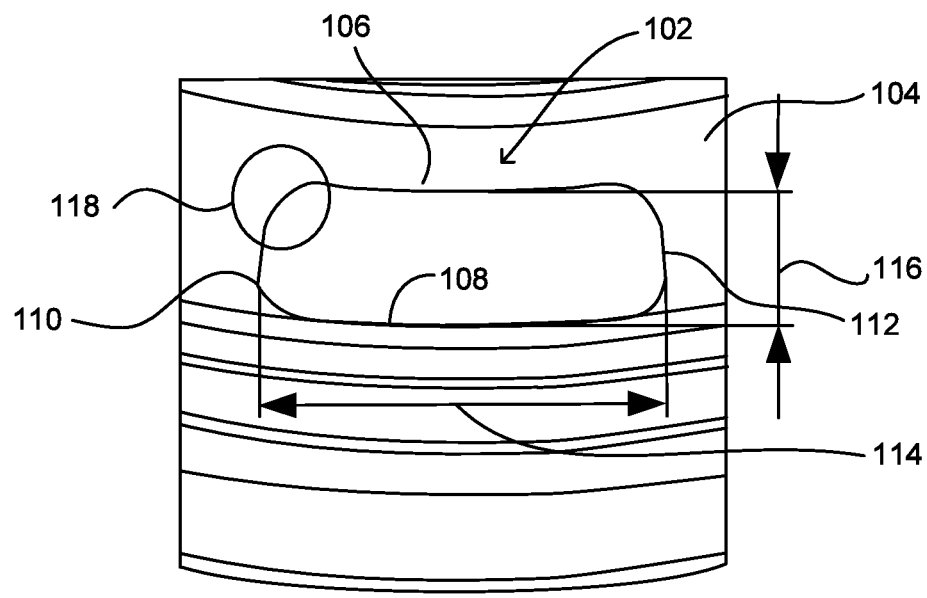
FIG. 5 is a rear view of cooling vents or windows of a prior art brake drum.

The cooling vent of the invention may be optionally provided with a shape that further reduces the stress levels that cause crack formation. More specifically, FIG. 5 illustrates a prior art cooling vent, indicated in general at 102, formed in the straight type wraparound 104 of a brake drum. As illustrated in FIG. 5, the vent features an inner edge 106, an outer edge 108 and opposing side edges 110 and 112. The vent has a width 114 of approximately 2.16 inches and a height 116 of approximately 0.72 inches. As indicated 118, each corner of the vent features a radius to reduce stress levels at the points that crack formation is most likely to occur.

Figure 6:
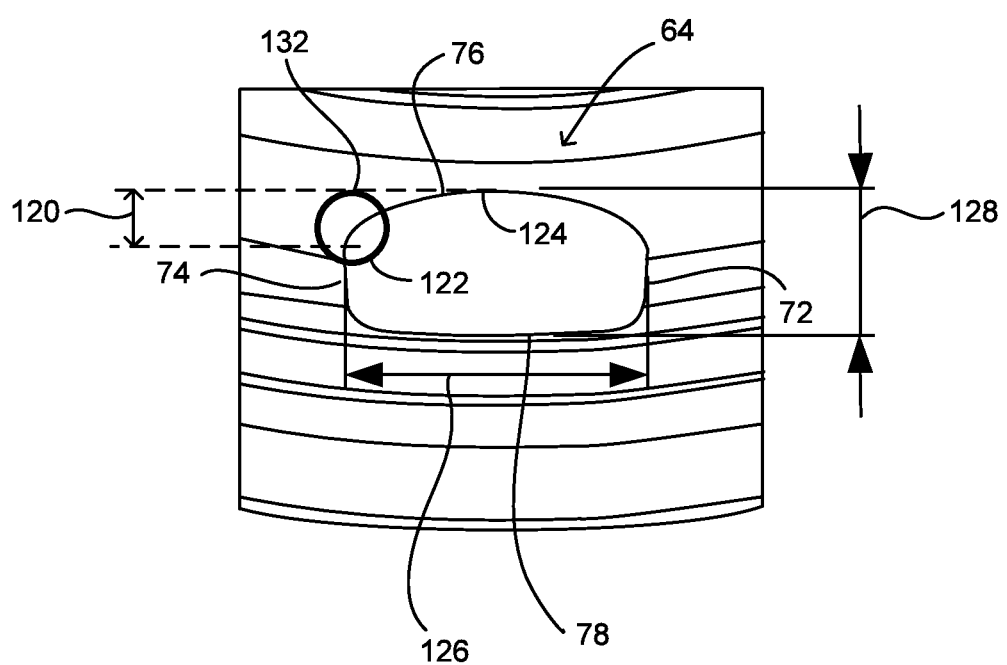
FIG. 6 is a rear view of cooling vents or windows in an embodiment of the brake drum of the present invention.

With reference to FIG. 6, in an embodiment of the brake drum of the invention, the cooling vent 64 features an inner edge 76 that is given a more rounded geometry while connecting two side edges 72 and 74. More specifically, the inner edge 76 of the cooling vent features a curved shape. The curve may feature a varying degree of curvature (such as a section of an oval) or a constant degree of curvature (such as a section of a circle), The curved shape preferably features a measurement 120, defined as the vertical distance between the point of the start of curvature of the inner edge from one of the side edges, indicated at 122 for side wall 74. and the point where the slope of curvature reverses direction, i.e. the center of inner edge 76, indicated at 124, that equals 0.1-0.7 times the width of the window. As an example, the vent 64 of FIG. 6 may have a width 126 of approximately 1.82 inches and a height 128 of approximately 0.87 inches, For such dimensions, measurement 120 would be in the range of 0.182 inches to 1.274 inches.

By combining the vent geometry of FIG. 6 with the shoulder type wrap around illustrated in FIGS. 3 and 4, material been added to, and bending moments have been reduced in, a region of high stresses, indicated at 132 in FIG. 6, that is the former locations of the two inner most corners of the vent (118 of FIG. 5), while only reducing the air flow area for cooling by approximately 5%.

In view of the above, embodiments of the invention utilize two design features: (1) the cooling vent is placed in a location selected for reduced bending stresses or moments and (2) the vent has a shape that is more rounded than the previous design to reduce stress levels at the locations where crack formation is most likely. As a result, embodiments of the invention add cooling vents for temperature advantages but maintain drum durability.

While the preferred embodiments of the invention have been shown and described, it will be apparent to those skilled in the art that changes and modifications may be made therein without departing from the spirit of the invention, the scope of which is defined by the appended claims.

What is claimed is:

1. A brake drum for a vehicle comprising:
  a) a cylindrical main body having a braking surface;
  b) a backing plate adapted to mourn the brake drum on the vehicle;
  c) a wraparound connecting the backing plate to the cylindrical main body, said wraparound including an inner annular section positioned adjacent to the backing plate that is generally horizontal when the brake drum is mounted on a vehicle and an outer annular section positioned adjacent to the cylindrical main body that is generally vertical when the brake drum is mounted on a vehicle so that a shoulder is formed between the inner and outer annular sections of the wraparound; and
  d) a vent including an inner edge and an outer edge joined by a pair of opposing side edges, said vent formed in the outer annular section with the outer edge positioned generally adjacent to the cylindrical main body and corners formed by the inner edge and the pair of opposing side edges positioned in the outer annular section;
  wherein the inner edge is more horizontal than vertical and the outer edge is more vertical than horizontal.

2. The brake drum of claim 1 wherein said inner edge features featuring a curved shape.

3. The brake drum of claim 2 wherein the inner edge features a curved shape that features a varying degree of curvature.

4. The brake. drum of claim 2 wherein the inner edge features a curved shape that features a constant decree of curvature.

5. The brake drum of claim 2 wherein the vent includes a width between the pair of opposing side edges and a measurement defined as a vertical distance between a point of the start of curvature of the inner edge of one of the pair of opposing side edges and a point on the inner edge where the slope of curvature reverses direction, and the measurement is in the range of 0.1 to 0.7 times the width of the window.

6. The brake drum of claim 5 wherein the point where the slope of curvature reverses direction is the center of the inner edge.

7. The brake drum of claim 5 wherein the vent includes a height between the outer edge and the center of the inner edge, and wherein the height to width ratio is equal to approximately 0.50.

8. The brake drum of claim 1 wherein a plurality of cooling vents are formed in the outer annular section of the wraparound.

9. The brake drum of claim 1 wherein the vent is formed solely in the outer annular section of the wraparound.

10. A. brake drum for a vehicle. comprising:
  a) a cylindrical main body having a braking surface;
  b) a backing plate adapted to mount the brake drum on the vehicle;
  c) a wraparound connecting the backing plate to the cylindrical main body, said wraparound including an inner annular section positioned adjacent to the backing plate that is generally horizontal when the brake drum is mounted on a vehicle and an outer annular section positioned adjacent to the cylindrical main body that is generally vertical when the brake drum is mounted on a vehicle so that a shoulder is formed between the inner and outer annular sections of the wraparound; and d) a vent formed in the outer annular section, said vent including an inner edge, an outer edge and a pair of opposing side edges joining the inner and outer edges., said inner edge featuring a curved shape and positioned adjacent to the shoulder of the wraparound so that corners formed by the inner edge and the pair of opposing side edges are positioned in the outer annular section; wherein the inner edge is more horizontal than vertical and the outer edge is more vertical than horizontal.

11. The brake drum of claim 10 wherein the vent includes a width between the pair of opposing side edges and a measurement defined as a vertical distance between a point of the start of curvature of the inner edge of one of the pair of opposing side edges and as point on the inner edge where the slope of curvature reverses direction, and the measurement is in the range of 0.1 to 0.7 times the width of the window.

12. The brake drum of claim 11 wherein the point where the slope of curvature reverses direction is the center of the inner edge.

13. The brake drum of claim 10 wherein the vent includes a height between the outer edge and a center of the inner edge, and wherein the height to width ratio is equal to approximately 0.50.

14. The brake drum of claim 10 wherein the inner edge features a curved shape that features a varying degree of curvature.

15. The brake drum of claim 10 wherein the inner edge features a curved shape that features a constant degree of curvature.

16. The brake drum of claim 10 wherein a plurality of cooling vents are formed in the outer annular section of the wraparound.

17. The brake drum of claim 10 wherein the vent is formed solely in the outer annular section of the wraparound.

\* \* \* \* \*

UNITED STATES PATENT AND TRADEMARK OFFICE
CERTIFICATE OF CORRECTION

PATENT NO. : 9,322,443 B2
APPLICATION NO. : 14/035246
DATED : April 26, 2016
INVENTOR(S) : Terrance Bordere It is certified that error appears in the above-identified patent and that said Letters Patent is hereby corrected as shown below:

On the title page item (57), in the fifth line, "me hacking" should instead read --the backing--.

In the claims

In claim 1, at column 4, line 9, "mourn" should instead read --mount--.

In claim 4, at column 4, line 34, "decree" should instead read --degree--.

In claim 10, at column 4, line 55, delete the "." between "A" and "brake".

In claim 10, at column 4, line 55, delete the "." between "vehicle" and "comprising".

In claim 10, at column 5, line 3, delete the "." between "edges" and the ",".

In claim 11, at column 5, line 14, "as" should instead read --a--.

Signed and Sealed this
Nineteenth Day of July, 2016

Michelle K. Lee
*Director of the United States Patent and Trademark Office*